United States Patent [19]

Püntener

[11] Patent Number: 4,923,973
[45] Date of Patent: May 8, 1990

[54] 1:2 COBALT COMPLEXES OF DISAZO DYES

[75] Inventor: Alois Püntener, Rheinfelden, Switzerland

[73] Assignee: Ciba-Geigy Corporation, Ardsley, N.Y.

[21] Appl. No.: 382,001

[22] Filed: Jul. 17, 1989

Related U.S. Application Data

[63] Continuation of Ser. No. 567,014, Dec. 30, 1983, abandoned.

[30] Foreign Application Priority Data

Jan. 5, 1983 [CH] Switzerland .............................. 46/83

[51] Int. Cl.$^5$ ...................... C09B 45/24; C09B 33/04; D06P 1/10; D06P 3/02
[52] U.S. Cl. .................... 534/684; 534/573; 534/602; 534/699; 534/688
[58] Field of Search .......................... 534/684

[56] References Cited

U.S. PATENT DOCUMENTS

| | | | |
|---|---|---|---|
| 2,117,707 | 5/1938 | Daudt | 534/634 X |
| 2,136,650 | 11/1938 | Crossley et al. | 534/684 |
| 2,153,531 | 4/1939 | Lange | 534/684 |
| 2,200,445 | 5/1940 | Fellmer | 534/684 X |
| 2,257,165 | 9/1941 | Fellmer | 534/684 |
| 4,424,152 | 1/1984 | Mennicke et al. | 534/684 |

FOREIGN PATENT DOCUMENTS

| | | | |
|---|---|---|---|
| 0022485 | 1/1981 | European Pat. Off. | 534/634 |
| 0073950 | 3/1983 | European Pat. Off. | 534/634 |
| 707225 | 5/1941 | Fed. Rep. of Germany | 534/684 |

Primary Examiner—Floyd D. Higel
Attorney, Agent, or Firm—Wenderoth, Lind & Ponack

[57] ABSTRACT

1:2 Cobalt complex dyes of the general formula I

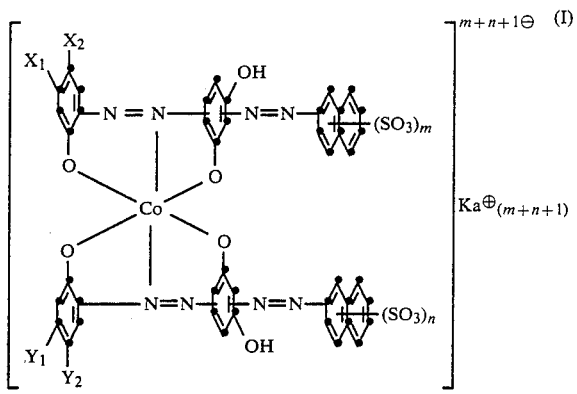

in which $X_1$ is nitro or hydrogen, $X_2$ is nitro, hydrogen, chlorine or methyl, $Y_1$ is nitro or hydrogen, $Y_2$ is nitro, hydrogen, chlorine or methyl, m and n, independently of each other, are each 1, 2 or 3, and $Ka^+$ is a cation, and one of each pair of substituents $X_1$ or $X_2$ and $Y_1$ or $Y_2$ is nitro and the other is as defined but not nitro are especially suitable for dyeing wool or polyamide and, in particular, leather.

6 Claims, No Drawings

1:2 COBALT COMPLEXES OF DISAZO DYES

This application is a continuation of now abandoned application, Ser. No. 06/567,014 filed on Dec. 30, 1983, abandoned.

The present invention relates to 1:2 cobalt complex dyes of the general formula I

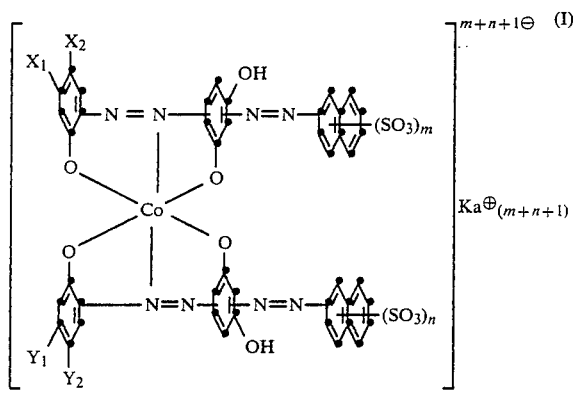

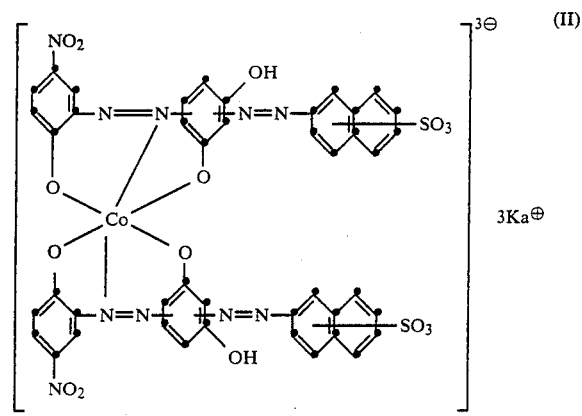

in which $X_1$ is nitro or hydrogen, $X_2$ is nitro, hydrogen, chlorine or methyl, $Y_1$ is nitro or hydrogen, $Y_2$ is nitro, hydrogen, chlorine or methyl, m and n, independently of each other, are each 1, 2 or 3, and $Ka^\oplus$ is a cation, and one of each pair of substituents $X_1$ or $X_2$ and $Y_1$ or $Y_2$ is nitro and the other is as defined but not nitro.

The phenolic diazo component of the disazo dyes is derived from 1-hydroxy-2-amino-4-chloro-5-nitrobenzene, 1-hydroxy-2-amino-4-methyl-5-nitrobenzene, but in particular from 1-hydroxy-2-amino-4-nitrobenzene or 1-hydroxy-2-amino-5-nitrobenzene.

The second diazo component in the disazo dyes is a 2-naphthylaminosulfonic acid having 1 to 3 sulfo groups, for example 2-naphthylamine-1-, -5-, -6-, -7- or -8-sulfonic acid, 2-naphthylamine-3,6-, -4,8-, -5,7- or -6,8-disulfonic acid or 2-naphthylamine-4,6,8-trisulfonic acid. Preference is given to the monosulfonic acids and among these in particular to 2-naphthylamine-6-sulfonic acid.

$Ka^\oplus$ is a cation, for example an alkali metal cation, such as lithium, potassium or preferably sodium. $Ka^\oplus$ can also be an ammonium cation or the ammonium salt of an organic amine.

The two disazo dyes contained in the 1:2 cobalt complexes of the formula shown can be different or preferably identical.

Of particular importance, thanks to their good dyeing properties, are the compounds of the formula II in which $Ka^\oplus$ is a cation.

Of these compounds, preference is given in particular to that compound where both the two sulfo groups are in the 6-position of the 2-naphthylamine radical. The novel dyes of the formula I can be prepared by methods known per se, for example by reacting a dye of the formula III

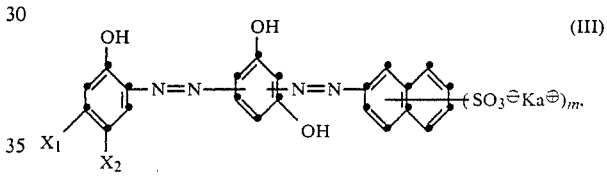

in which $X_1$ is nitro or hydrogen, $X_2$ is nitro, hydrogen, chlorine or methyl, one of the substituents $X_1$ or $X_2$ being nitro and the other being as defined but not nitro, $Ka^\oplus$ is a cation, and m is 1, 2 or 3, and a dye of the formula IV

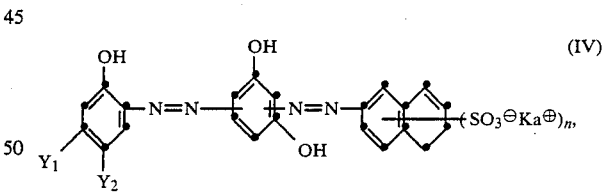

in which $Y_1$ is nitro or hydrogen, $Y_2$ is nitro, hydrogen, chlorine or methyl, one of the substituents $Y_1$ or $Y_2$ being nitro and the other being as defined but not nitro, $Ka^\oplus$ is a cation, and n is 1, 2 or 3, with a cobalt-donating agent to give a 1:2 cobalt complex in which the dyes of the formulae III and IV can be identical.

The dyes of the formula III and IV are known or can be prepared using known methods, namely by coupling a diazotised aminophenol and a diazotised aminonaphthalenesulfonic acid in any order with resorcinol.

The novel dyes of the formula I can also be prepared by first of all converting a dye of the formula V

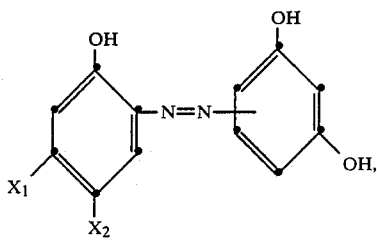

in which $X_1$ and $X_2$ are as defined above, and a dye of the formula VI

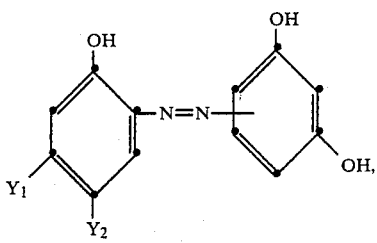

in which $Y_1$ and $Y_2$ are as defined above and are in particular so defined as to make the dyes of the formulae V and VI identical, into a 1:2 cobalt complex, onto which is then coupled a diazotised sulfonaphthylamine of the formula VII

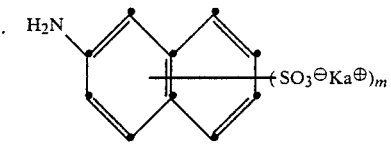

in which $Ka^\oplus$ and $m$ are as defined above.

It is also possible to use mixtures of two or more sulfonaphthylamines.

However, the preferred process for preparing the novel 1:2 cobalt complexes of the formula I comprises coupling resorcinol first with a sulfonaphthylamine of the formula VII and then with a nitroaminophenol of the formula VIII

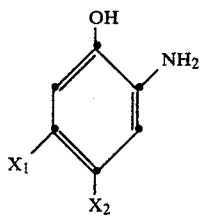

and thereafter converting the resulting disazo dye into a 1:2 cobalt complex.

This process is preferably carried out with 1 to 1.2 moles of sulfonaphthylamine and 1 to 0.8 mole of nitroaminophenol per mole of resorcinol.

The novel metal complex dyes of the formula I which can be obtained using the above process are isolated in the form of their salts, in particular as alkali metal, especially sodium or lithium, salts, or as ammonium salts or as salts of organic amines having a positively charged nitrogen atom, and are suitable for dyeing and printing various materials, in the absence or presence of a levelling assistant, but especially for dyeing and printing nitrogen-containing materials, such as silk or polyurethanes, but preferably for dyeing wool, polyamide and in particular fur or leather, all types of leather being suitable, for example chromed leather, retanned leather or suede leather from goat, cow and pig.

The dyeings have a brown shade with good fastness properties, in particular lightfastness and wetfastness properties.

The example below serves to illustrate the invention without limiting it. Parts and percentages are by weight. The temperatures are given in degrees centigrade.

EXAMPLE 1

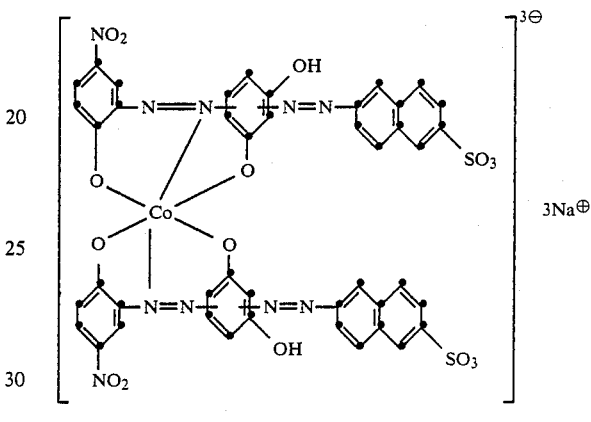

11 parts of resorcinol are introduced into 100 parts of water, and 26.8 parts of 2-naphthylamino-6-sulfonic acid diazotised with acid and nitrite in conventional manner are added. The pH is made slightly acid by adding 2M sodium hydroxide solution. After the end of the first coupling, 15.4 parts of 2-amino-4-nitrophenol which has likewise been diazotised in conventional manner are added, a slightly alkaline pH being maintained with 2M sodium hydroxide solution. The second coupling leads to a mixture of dyes in which the main component is the disazo dye of the formula shown above.

The dye obtained is metallised at 80° and a pH held neutral or weakly alkaline with 2M sodium hydroxide solution with 50 ml of a 1M cobalt sulfate solution in the course of 6 hours. It is then salted out with 200 parts of a 1:1 mixture of potassium chloride and sodium chloride, is filtered off and is dried. The dark powder obtained dyes leather in a reddish brown shade having good fastness properties.

The cobalt complex described above differs from the analogous chromium and iron complexes in that its dyeings on leather have a better lightfastness.

EXAMPLE 2

Example 1 is repeated, except that 2-amino-4-nitrophenol is replaced by the same amount of 2-amino-5-nitrophenol, affording a dye which dyes leather in a less reddish brown having good fastness properties.

EXAMPLE 3

Example 1 is repeated, except that 2-amino-4-nitrophenol is replaced by the same amount of a mixture of equal parts of 2-amino-4-nitrophenol and 2-amino-5-nitrophenol, affording a dye which dyes leather in a less reddish brown having good fastness properties.

Example 1 is repeated, except that equivalent amounts of the aminophenols listed in column 2 of the table below and of the naphthylaminosulfonic acids recorded in column 3 are used, affording dyes which dye leather in the shade given in column 4.

TABLE

| No. | Aminophenol | 2-Naphthylaminesulfonic acid | Shade on leather |
|---|---|---|---|
| 1 | 2-amino-4-nitrophenol (OH, NH$_2$, NO$_2$) | 1-SO$_3$H-2-naphthylamine | reddish brown |
| 2 | 2-amino-5-nitrophenol (OH, NH$_2$, O$_2$N) | " | brown |
| 3 | " | 2-amino-naphthalene-5,8-disulfonic acid (SO$_3$H, NH$_2$, SO$_3$H) | brown |
| 4 | 2-amino-4-nitrophenol (OH, NH$_2$, NO$_2$) | 2-amino-naphthalene-5,8-disulfonic acid (SO$_3$H, NH$_2$, SO$_3$H) | reddish brown |
| 5 | " | 2-amino-naphthalene-6-sulfonic acid (NH$_2$, SO$_3$H) | reddish brown |
| 6 | " | 2-amino-naphthalene-7-sulfonic acid (HO$_3$S, NH$_2$) | orange-tinged brown |
| 7 | " | 2-amino-naphthalene-8-sulfonic acid (SO$_3$H, NH$_2$) | reddish brown |

| No. | Aminophenol | 2-Naphthylaminesulfonic acid | Shade on leather |
|---|---|---|---|
| 8 | " | 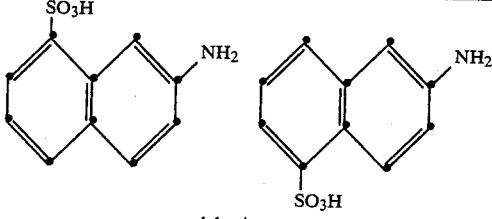 1:1 mixture | reddish brown |
| 9 | 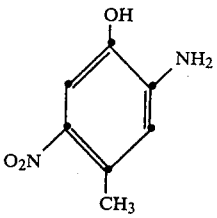 | 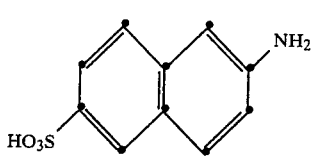 | brown |
| 10 | 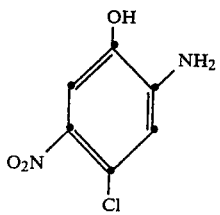 | 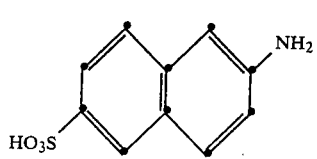 | brown |

DYEING METHOD FOR LEATHER 100 parts of clothing suede leather are wetted out at 50° in a solution of 1,000 parts of water and 2 parts of 24% ammonia for 2 hours and are then dyed at 60° in a solution of 1,000 parts of water, 2 parts of 24% ammonia and 3 parts of the dye of the example for 1 hour. A solution of 40 parts of water and 4 parts of 85% formic acid is added, and the dyeing is continued for a further 30 minutes. The pieces of leather are then thoroughly rinsed and, if desired, further treated at 50° with 2 parts of a dicyanodiaminoformaldehyde condensation product for 30 minutes. This gives a reddish brown dyeing having good fastness properties.

What is claimed is:

1. A 1:2 cobalt complex dye of the formula

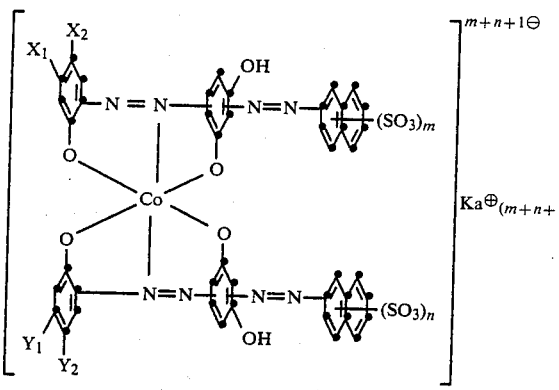

in which $X_1$ is nitro or hydrogen, $X_2$ is nitro, hydrogen, chlorine or methyl, $Y_1$ is nitro or hydrogen, $Y_2$ is nitro, hydrogen, chlorine or methyl, m and n, independently of each other, are each 1, 2 or 3, and $Ka^\oplus$ is a cation, and one of each pair of substituents $X_1$ or $X_2$ and $Y_1$ or $Y_2$ is nitro and the other is as defined but not nitro.

2. A dye according to claim 1, in which $X_2$ and $Y_2$, independently of each other, are each nitro or hydrogen.

3. A dye according to claim 1, in which m and n are each 1.

4. A dye according to claim 3, in which the sulfo groups are each bonded in the 6-position of the 2-naphthylamine radical.

5. A dye according to claim 1 of the formula

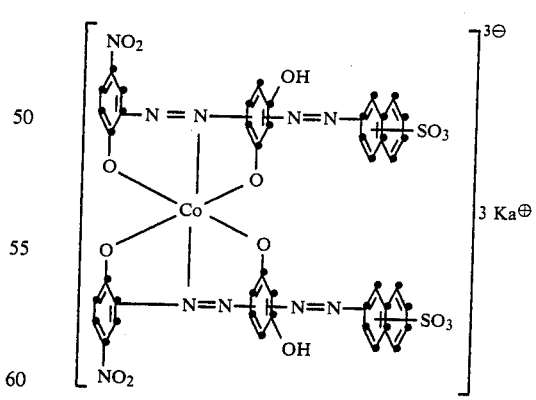

in which $Ka^\oplus$ is cation.

6. A dye according to claim 5, in which the sulfo groups are each bonded in the 6-position of the 2-naphthylamine radical.

* * * * *